US008305601B2

(12) United States Patent
Kawai

(10) Patent No.: US 8,305,601 B2
(45) Date of Patent: Nov. 6, 2012

(54) DEVICE INFORMATION MANAGEMENT SYSTEM, COMPUTER AND PROGRAM

(75) Inventor: Sunao Kawai, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1369 days.

(21) Appl. No.: 11/359,575

(22) Filed: Feb. 23, 2006

(65) Prior Publication Data

US 2006/0192999 A1  Aug. 31, 2006

(30) Foreign Application Priority Data

Feb. 25, 2005 (JP) ................................. 2005-050731

(51) Int. Cl.
  *G06F 3/12* (2006.01)
(52) U.S. Cl. ....... 358/1.15; 709/203; 709/220; 709/222; 710/8; 719/327
(58) Field of Classification Search .................. 358/457, 358/1.13, 1.14, 1.15; 370/351; 399/8; 500/76; 707/705; 709/203, 220, 222, 223, 224; 710/1, 710/8; 719/321, 327
  See application file for complete search history.

(56) References Cited

U.S. PATENT DOCUMENTS

| | | | | |
|---|---|---|---|---|
| 6,131,134 | A * | 10/2000 | Huang et al. ................... 710/302 |
| 6,182,086 | B1 * | 1/2001 | Lomet et al. ................... 707/202 |
| 6,633,400 | B1 * | 10/2003 | Sasaki et al. ................ 358/1.15 |
| 6,728,787 | B1 | 4/2004 | Leigh |
| 6,789,111 | B1 * | 9/2004 | Brockway et al. ............ 709/222 |
| 2002/0067498 | A1 * | 6/2002 | Chapman ..................... 358/1.13 |
| 2002/0083227 | A1 * | 6/2002 | Machida ............................ 710/8 |
| 2002/0156947 | A1 * | 10/2002 | Nishio ............................. 710/36 |
| 2003/0101294 | A1 * | 5/2003 | Saint-Hilaire et al. .......... 710/11 |
| 2003/0120624 | A1 | 6/2003 | Poppenga et al. |
| 2003/0195951 | A1 * | 10/2003 | Wittel et al. ................... 709/220 |
| 2004/0105113 | A1 * | 6/2004 | Ishida et al. ................. 358/1.13 |
| 2004/0170460 | A1 * | 9/2004 | Mokuya et al. ................. 400/76 |
| 2005/0060367 | A1 * | 3/2005 | Brockway et al. ............ 709/203 |
| 2005/0094163 | A1 * | 5/2005 | Kim .............................. 358/1.6 |
| 2005/0111856 | A1 | 5/2005 | Kawai |

FOREIGN PATENT DOCUMENTS

| | | |
|---|---|---|
| EP | 1022652 A2 | 7/2000 |
| EP | 1357467 A2 | 10/2003 |
| JP | 5-199244 A | 8/1993 |
| JP | 2005-128890 A | 5/2005 |

OTHER PUBLICATIONS

EP Search Report, Jun. 21, 2006, EP Appln. 06251015.

* cited by examiner

*Primary Examiner* — King Poon
*Assistant Examiner* — David S Cammack
(74) *Attorney, Agent, or Firm* — Banner & Witcoff, Ltd.

(57) ABSTRACT

There is provided a device information management system, including a server, a client and a device in which the server and the client are configured to communicate with each other via a first communication channel while the client and the device are configured to communicate with each other via a second communication channel different from the first communication channel and device information is transmitted from the device to the client via the second communication channel and from the client to the server via the first communication channel and registered in a database of the server. The device includes a device-side information supplying unit configured to supply the device information to the client via the second communication channel.

15 Claims, 7 Drawing Sheets

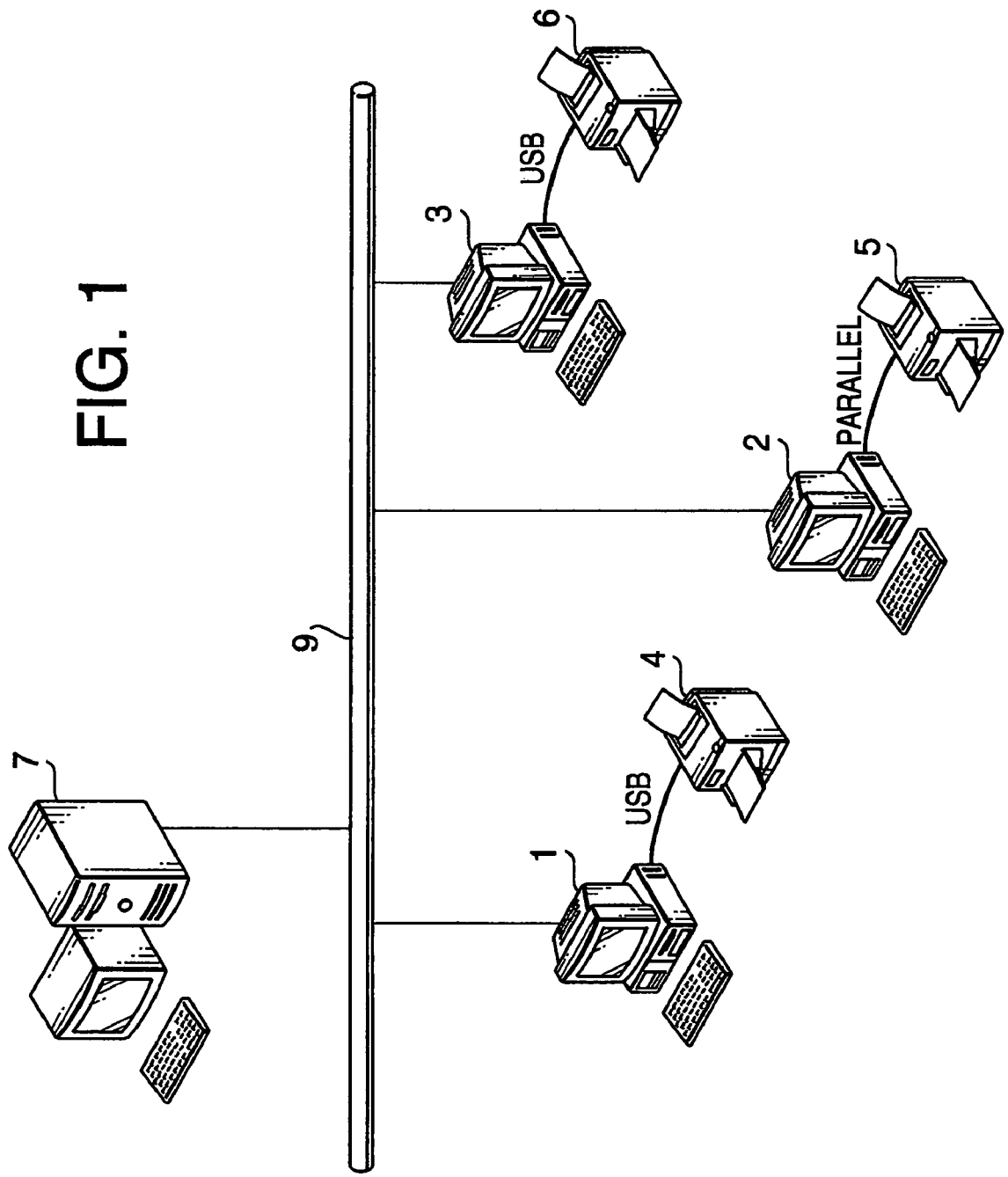

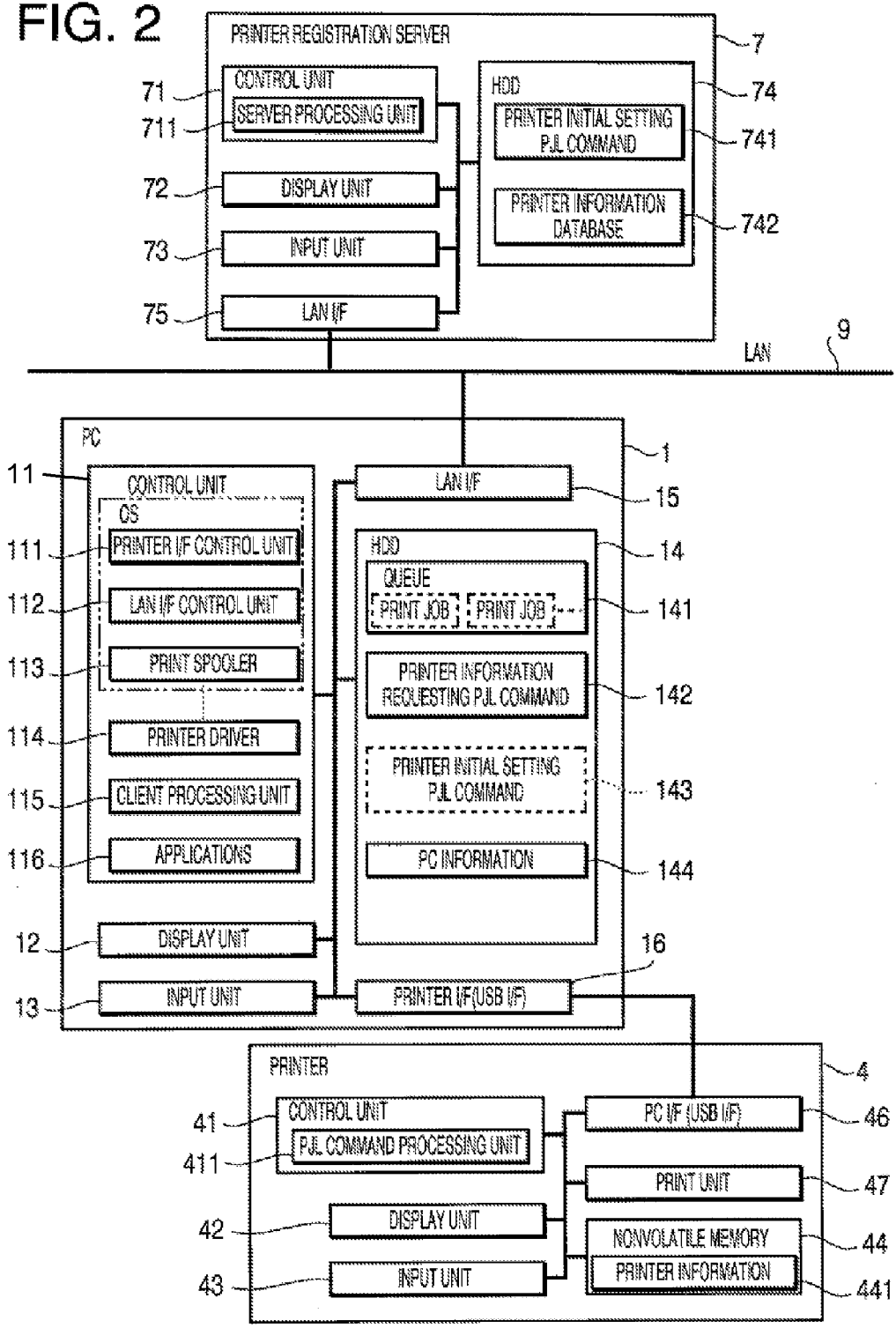

|  | PC NAME |
|---|---|
| PC1 | officeA1 |
| PC2 | officeA2 |
| PC3 | officeB1 |

FIG.3A

|  | MODEL NAME | SERIAL NO. | VERSION |
|---|---|---|---|
| PRINTER 4 | LP1001 | PLU23456 | 1.01 |
| PRINTER 5 | LP1002 | PLP34567 | 2.11 |
| PRINTER 6 | LP2001 | PLU23461 | 1.03 |

FIG.3B

```
o=devicemaneger.c=JP
    cn=officeA1  printerName=LP1001 serialNumber=PLU23456 version=1.01
    cn=officeA2  printerName=LP1002 serialNumber=PLP34567 version=2.11
    cn=officeB1  printerName=LP2001 serialNumber=PLU23461 version=1.03
```

FIG.3C

DEVICE INFORMATION MANAGEMENT SYSTEM, COMPUTER AND PROGRAM

CROSS-REFERENCE TO RELATED APPLICATION

This application claims priority under 35 U.S.C. §119 from Japanese Patent Application No. 2005-050731, filed on Feb. 25, 2005. The entire subject matter of the application is incorporated herein by reference.

FIELD

Aspects relate to a device information management system (including a server and a client connected to a network and a device connected to the client) for managing information on the device by the server by letting the client acquire information on the device and transmit the acquired information to the server, a computer which is used as the client forming the device information management system, and a program for letting the computer function as the client of the device information management system.

BACKGROUND

Among conventional systems having hierarchical structure in which each low-level device is connected with a middle-level device and each middle-level device is connected with a high-level device, a system realizing the collection and management of information on the low-level devices by the high-level device by letting each middle-level device acquire information on the low-level devices and transfer the acquired information to the high-level device is well known, as disclosed in Japanese Patent Provisional Publication No. HEI05-199244 (hereinafter referred to as a "JP 5-199244"), for example.

However, in the system of the JP 5-199244, each middle-level device constantly executes a polling process for checking the presence/absence of the low-level devices, by which the middle-level devices and low-level devices are placed under excessive loads even when collecting the information on the low-level devices only once is enough for the high-level device.

Specifically, each middle-level device, having to periodically execute the polling process even when no low-level device has been added, constantly executes the process wastefully with no low-level device being added, by which the load on each middle-level device becomes heavy. Similarly, each low-level device has to reply to the polling even though the low-level device has already been recognized by the middle-level device, by which the load on each low-level device is also necessitated to become heavy.

SUMMARY

Aspects of the invention provide a device information management system, including a server and a client connected to a network and a device connected to the client, capable of letting the client execute an information transmission process (acquiring information on the device and transmitting the acquired information to the server) reliably at the point when a new device is added and thereafter letting the server manage the information on the device without allowing excessive loads on the client and the device.

BRIEF DESCRIPTION OF THE ACCOMPANYING DRAWINGS

FIG. 1 is a schematic diagram showing the overall composition of a device information management system according to at least one aspect of the invention.

FIG. 2 is a block diagram showing the internal composition of a PC, a printer and a printer registration server included in the device information management system according to at least one aspect of the invention.

FIGS. 3A, 3B and 3C are tables showing PC information, printer information and database structure employed in the device information management system, respectively according to at least one aspect of the invention.

DETAILED DESCRIPTION

General Overview

Figure 4:
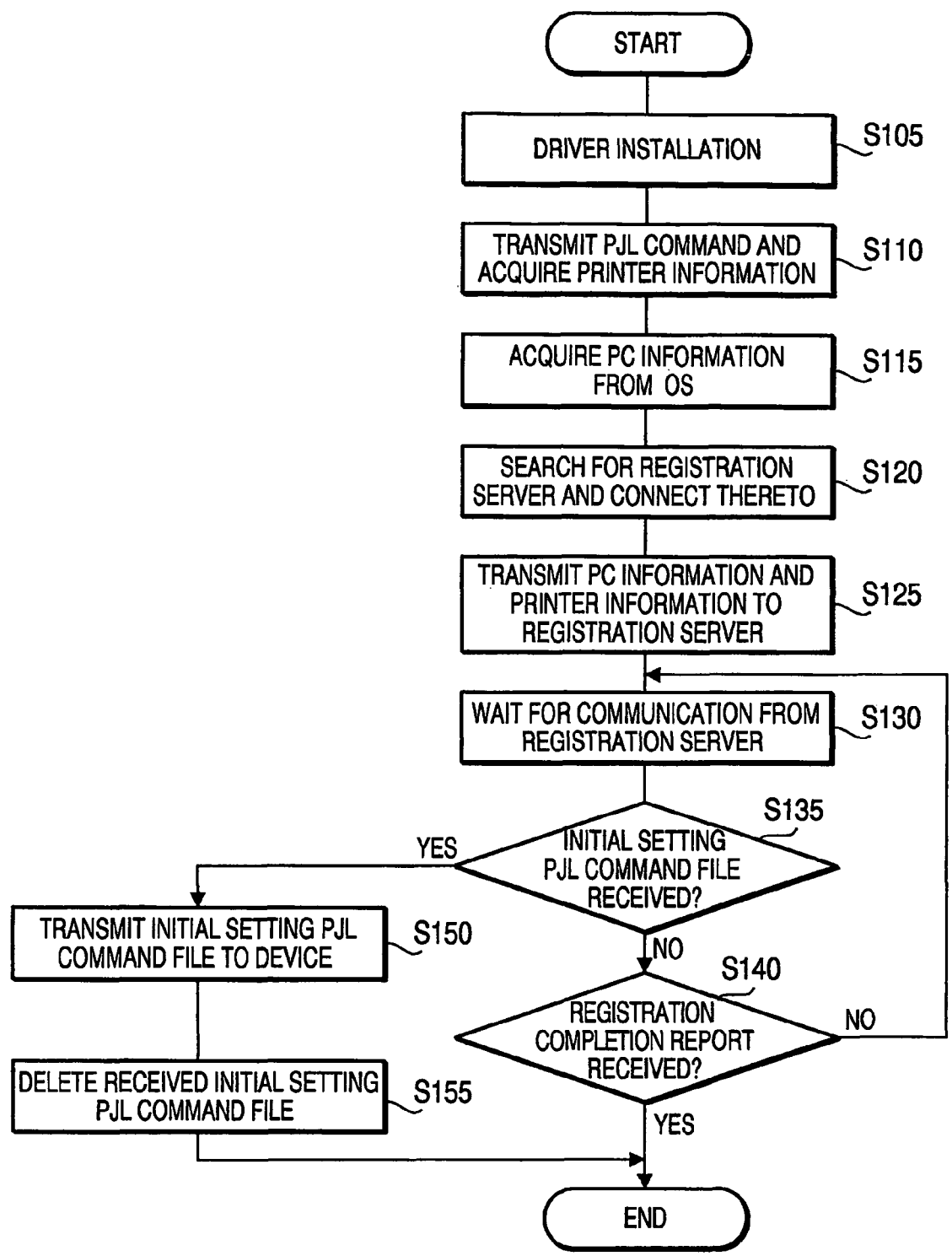
FIG. 4 is a flow chart showing an installation process as an example of a client process executed by the PC according to at least one aspect of the invention.

There is provided a device information management system including a server, a client and a device in which the server and the client are configured to communicate with each other via a first communication channel while the client and the device are configured to communicate with each other via a second communication channel different from the first communication channel and device information is transmitted from the device to the client via the second communication channel and from the client to the server via the first communication channel and registered in a database of the server. In the device information management system, the device includes a device-side information supplying unit configured to supply the device information to the client via the second communication channel. The client includes: a client-side information acquiring unit configured to acquire the device information from the device via the second communication channel following a device registration process for communication with the device; and a client-side information supplying unit configured to supply the device information acquired by the client-side information acquiring unit to the server via the first communication channel. The server includes: a server-side information acquiring unit configured to acquire the device information from the client via the first communication channel; and an information registering unit which registers the device information acquired by the server-side information acquiring unit in the database.

In the device information management system configured as above, the device-side information supplying unit of the device supplies the device information to the client via the second communication channel, and the client-side information acquiring unit of the client acquires the device information from the device via the second communication channel. In at least one aspect, the client-side information acquiring unit acquires the device information from the device following installing a device driver for communication with the device. After the acquisition of the device information, the client-side information supplying unit of the client supplies the device information acquired by the client-side information acquiring unit to the server via the first communication channel, and the server-side information acquiring unit of the server acquires the device information from the client via the first communication channel. The information registering unit of the server registers the device information acquired by the server-side information acquiring unit in the database.

Therefore, in the device information management system, when a new device is connected to the client, the device information on the device may be transmitted from the device to the server via the client only by installing the device driver in the client. Therefore, the server is capable of recognizing the connection of a new device to the client and registering the device information on the device in the database immediately, substantially at the point when the device becomes available to the client by the installation of the device driver.

Further, the client and the new device are generally configured to communicate information with each other just after the installation process and the power of the device is unlikely to be turned OFF until a sequence of processes following the installation process is completed. Therefore, the device information on the device can be acquired and registered in the database with higher probability and reliability compared to cases where similar processes are executed with different timing.

Configurations desirable to the above device information management system will be described below.

In at least one aspect, the client further includes an information requesting unit configured to transmit a request for the device information to the device via the second communication channel. The device lets the device-side information supplying unit supply the device information to the client via the second communication channel when the request for the device information is received from the client.

In the device information management system configured as above, the information requesting unit of the client transmits a request for the device information to the device via the second communication channel, by which the device can recognize the timing for supplying the device information to the client.

In at least one aspect, the device information supplied by the device-side information supplying unit to the client via the second communication channel includes information capable of uniquely identifying the device.

The "information capable of uniquely identifying the device" means a serial number assigned to each device, a MAC address assigned to each communication device, or any other information which is assigned differently to separate devices even when the devices are of the same model.

In the device information management system configured as above, the server can acquire the device information containing the information capable of uniquely identifying each device and utilize the information for the management of devices in the system.

In at least one aspect, the device information supplied by the device-side information supplying unit to the client via the second communication channel includes version information on the device.

The "version information on the device" means ROM version information stored in a non-rewritable memory of the device, firmware version information stored in a rewritable nonvolatile memory of the device, etc.

In the device information management system configured as above, the server can acquire the device information including the version information on each device and utilize the information for the management of devices in the system.

In at least one aspect, the server further includes: a judgment unit which judges whether the device information acquired by the server-side information acquiring unit is information corresponding to an already-registered device which has already been registered in the database; and a setting information supplying unit configured to supply setting information to be used for making settings of the device to the client via the first communication channel when the device information is judged not to be information corresponding to an already-registered device by the judgment unit. The client further includes: a setting information acquiring unit configured to acquire the setting information supplied from the server; and a setting instruction transmitting unit configured to transmit a setting instruction for setting the device to the device via the second communication channel according to the setting information acquired by the setting information acquiring unit.

In the device information management system configured as above, the setting information to be used for making settings of the device is prepared in the server. The judgment unit judges whether the device information acquired by the server-side information acquiring unit is information corresponding to an already-registered device which has already been registered in the database. When the device information is judged not to be information corresponding to an already-registered device by the judgment unit, the setting information supplying unit of the server supplies the setting information (to be used for making settings of the device) to the client via the first communication channel. In the client, the setting information acquiring unit acquires the setting information supplied from the server, and the setting instruction transmitting unit transmits a setting instruction for setting the device to the device via the second communication channel according to the setting information acquired by the setting information acquiring unit. Incidentally, when the setting information transmitted from the server to the client is in a format that can be directly transferred to the device as the instruction, the setting instruction transmitting unit may be configured as a unit for directly transferring the acquired setting information to the device. When the setting information transmitted from the server to the client is not in such a format that can be directly transferred to the device as the instruction, the setting instruction transmitting unit is configured as a unit for analyzing the acquired setting information, converting the setting information into a format that can be received by the device as the instruction, and transmitting the converted instruction to the device.

In the device information management system, the server is capable of not only managing the information on the devices in the system but also making settings of a new device according to the setting information prepared in the server when the existence of the device is recognized.

In at least one aspect, the client-side information supplying unit of the client supplies client information to the server in addition to the device information. The server-side information acquiring unit of the server acquires the client information from the client in addition to the device information. The information registering unit of the server registers the device information and the client information acquired by the server-side information acquiring unit in the database while associating them with each other.

In the device information management system configured as above, the server registers the device information and the client information in the database while associating them with each other, by which the server can manage the devices in the system while associating the devices with clients (e.g. keeping track of the connections between the devices and clients).

In at least one aspect, the client information includes a computer name assigned to the client.

With the above configuration, the server can manage the client by use of the computer name assigned to the client.

In at least one aspect, the device driver is software communicating with the device and controlling the device.

In this case, not only the communication with the device but also the control of the device is realized by the device driver installed in the client.

In at least one aspect, the device is a printing device having a printer function and the device driver is a printer driver.

In this case, the printer driver of the client can transmit print data to the printing device. The printing device can receive the print data transmitted from the printer driver and execute printing on a sheet-like medium (e.g. paper) with its print unit according to the received print data.

There is provided a device information management system including a server, a client and a device in which the server and the client are configured to communicate with each other via a first communication channel while the client and the device are configured to communicate with each other via a second communication channel different from the first communication channel and device information is transmitted from the device to the client via the second communication channel and from the client to the server via the first communication channel and registered in a database of the server. In the device information management system, the client includes a client-side information supplying unit configured to supply the device information on a device which has already been registered in the server to the server via the first communication channel prior to a device deregistration process for deregistering the device. The server includes: a server-side information acquiring unit configured to acquire the device information from the client via the first communication channel; and an information deregistering unit which deregisters the already-registered device specified by the device information acquired by the server-side information acquiring unit.

In the device information management system configured as above, when the uninstallation process for uninstalling a device driver (software necessary for communication with an already-registered device which has already been registered in the server) is executed, the client-side information supplying unit supplies the device information on the already-registered device to the server via the first communication channel prior to the uninstallation process. In the server, the server-side information acquiring unit acquires the device information from the client via the first communication channel and the information deregistering unit deregisters the already-registered device specified by the device information acquired by the server-side information acquiring unit.

In the device information management system configured as above, an already-registered device can be deregistered from the database only by uninstalling the device driver for communication with the already-registered device. Therefore, the user may be relieved of the need of separately executing the uninstallation of the device driver and the deregistration of the device from the database, by which unnecessary registration information can be deleted from the server with reliability.

The following configuration is desirable to the above device information management system.

In at least one aspect, the device includes a device-side information supplying unit configured to supply the device information to the client via the second communication channel. The client further includes a client-side information acquiring unit configured to acquire the device information from the device via the second communication channel prior to uninstalling a device driver for communication with the device. The client-side information supplying unit supplies the device information acquired by the client-side information acquiring unit to the server.

In the device information management system configured as above, the device-side information supplying unit supplies the device information to the client via the second communication channel. In the client, the client-side information acquiring unit acquires the device information from the device via the second communication channel prior to uninstalling the device driver for communication with the device, and the client-side information supplying unit supplies the device information acquired by the client-side information acquiring unit to the server.

Therefore, the device information on a device can be supplied to the server and the device can be deregistered from the device without the need of prestoring the device information (to be supplied to the server by the client-side information supplying unit) in the client or letting the user input the device information on each uninstallation of a device.

There is provided a computer which includes: an information acquiring unit configured to acquire device information from a device via a communication channel following a device registration process for communication with the device; and an information supplying unit configured to supply the device information acquired by the information acquiring unit to another device via an another communication channel.

The computer configured as above is equipped with the same units as the client in a device information management system which has been described before, and thus such a device information management system can be formed and the same effects can be achieved by use of the computer.

The computer is a system element equivalent to the client in the aforementioned device information management system as mentioned above, and thus the computer may of course be further provided with the aforementioned configurations desirable to the client in the aforementioned device information management system.

There is provided a computer which includes an information supplying unit configured to supply device information on a first device which has already been registered in a second device to the second device via a communication channel prior to a device deregistration process for deregistering the already registered first device.

The computer configured as above is equipped with the same units as the client in a device information management system which has been described before, and thus such a device information management system can be formed and the same effects can be achieved by use of the computer.

The computer is a system element equivalent to the client in the aforementioned device information management system as mentioned above, and thus the computer may of course be further provided with the aforementioned configurations desirable to the client in the aforementioned device information management system.

There is provided a computer program product including computer-readable instructions that cause a computer to have functions as: an information acquiring unit configured to acquire device information from a device via a communication channel following a device registration process for communication with the device; and an information supplying unit configured to supply the device information acquired by the information acquiring unit to another device via an another communication channel.

By letting the computer execute the computer-readable instructions of the computer program product, the computer functions in the same way as the client in a device information management system which has been described before, and thus such a device information management system can be formed and the same effects can be achieved by use of the computer.

The computer executing the computer-readable instructions functions as a system element equivalent to the client in the aforementioned device information management system as mentioned above, and thus the computer-readable instructions may of course further include instructions implementing the aforementioned configurations desirable to the client in the aforementioned device information management system.

There is provided a computer program product including computer-readable instructions that cause a computer to have functions as: an information supplying unit configured to supply device information on a first device which has already been registered in a second device to the second device via a communication channel prior to a device deregistration process for deregistering the already registered first device.

By letting the computer execute the computer-readable instructions of the computer program product, the computer functions in the same way as the client in a device information management system which has been described before, and thus such a device information management system can be formed and the same effects can be achieved by use of the computer.

The computer executing the computer-readable instructions functions as a system element equivalent to the client in the aforementioned device information management system as mentioned above, and thus the computer-readable instructions may of course further include instructions implementing the aforementioned configurations desirable to the client in the aforementioned device information management system.

Illustrative Embodiments

Referring now to the drawings, a description will be given in detail of an illustrative embodiment.

FIG. 1 is a schematic diagram showing the overall composition of a device information management system in accordance with the illustrative embodiment.

The system includes PCs (Personal Computers) 1, 2 and 3 functioning as "clients" in the system, printers 4, 5 and 6 functioning as "devices" in the system which are connected to the PCs 1, 2 and 3 respectively, and a printer registration server 7 functioning as a "server" in the system. In this system, the PCs 1, 2 and 3 and the printer registration server 7 are connected together by a LAN (Local Area Network) 9 to communicate information. The printer 4 is connected to the PC 1 via USB (Universal Serial Bus) interfaces. The printer 5 is connected to the PC 2 via parallel interfaces. The printer 6 is connected to the PC 3 via USB interfaces.

FIG. 2 is a block diagram showing the internal composition of the PC 1, the printer 4 and the printer registration server 7 selected from the system.

As shown in FIG. 2, the PC 1 includes a control unit 11, a display unit 12, an input unit 13, an HDD (Hard Disk Drive) 14, a LAN I/F (interface) 15 and a printer I/F 16. The printer I/F 16 of the PC 1 is a USB interface.

The control unit 11 is mainly composed of a CPU (Central Processing Unit), a ROM (Read Only Memory) and a RAM (Random Access Memory) which are well known. In the control unit 11, the ROM stores a BIOS (Basic Input Output System) and some amount of basic data. Into the RAM, programs such as an OS (Operating System) and various applications are loaded from the HDD 14. The CPU of the control unit 11 executes various processes in parallel (in a time-sharing manner) according to programs stored in the ROM and the RAM, by which a printer I/F control unit 111 controlling the printer I/F 16, a LAN I/F control unit 112 controlling the LAN I/F 15, a print spooler 113 managing print data to be outputted to the printer 4 as a print job, etc. are formed in the control unit 11 as functional units provided by the OS. In the control unit 11 of the PC 1, processes according to a variety of software prepared separately from the OS are also executed in parallel, by which a printer driver 114 (controlling the printer 4 in various ways), a client processing unit 115 (letting the PC 1 function as a client in the system by executing a client process which will be explained later) and other applications 116 function in parallel.

The display unit 12 is implemented by an LCD (Liquid Crystal Display), for example. The input unit 13 is formed by a keyboard and various pointing devices (e.g. mouse), for example.

The HDD 14 is a storage unit storing the OS, various application programs and various data files, in which a queue 141 for storing print jobs generated by the print spooler 113 is also reserved. The HDD 14 also stores printer information requesting a PJL command 142, a printer initial setting PJL command 143, PC information 144, and etc. The printer information requesting the PJL command 142 and the printer initial setting PJL command 143 are commands described in the PJL (Printer Job Language) which are given to the printer 4 in a process which will be explained later. The PJL is a well-known command language developed by Hewlett-Packard Co. and thereafter employed by other companies. The PJL is used by a PC (to which a printer is connected) for controlling various functions of the printer. The PC information 144 is information representing a PC name in this illustrative embodiment. As shown in FIG. 3A, PC names "officeA1", "officeA2" and "officeA3" have been assigned to the PCs 1, 2 and 3, respectively. By specifying a PC name, a PC having the specified PC name can be uniquely identified since a plurality of PCs in a system are generally assigned different PC names. Incidentally, the PC information 144 is used as "client information" in this system. The PC information 144 may also be information other than the PC name, or may be a combination of the PC name and one or more pieces of other information. Such information other than the PC name can be the name of the OS, the version of the OS, the MAC address of the network interface of (or attached to) the PC, the version of the printer driver 114, the user name, information on the installation location of the PC, etc. Including such information in the PC information 144 is advantageous for checking the performance, installation location, status of use, etc. of the PC.

The LAN I/F 15 is a unit for communicating with devices connected to the LAN 9. The LAN I/F 15 is mainly composed of a NIC (Network Interface Card).

The printer I/F 16 is a unit for communicating with the printer 4. The printer I/F 16 in the PC 1 is a USB interface.

In the PC 1 configured as above, the printer driver 114 processes data to be outputted to the printer 4 (data outputted by the client processing unit 115 and the applications 116) in cooperation with the print spooler 113. For example, when print data is outputted by an application 116, the print data is handed over to the printer driver 114. The print data is processed by the printer driver 114 in a prescribed manner if necessary and thereafter handed over to the print spooler 113. The print spooler 113 receiving print data from the printer driver 114 executes a process for successively storing the received print data in the queue 141 in the HDD 14 as print jobs and a process for successively outputting the print jobs stored in the queue 141 to the printer 4 in order of storage or according to priorities assigned to the print jobs. By the processes, the print data are outputted to the printer 4.

While details will be explained later, the client processing unit 115 outputs the PJL commands (the printer information requesting PJL command 142 and the printer initial setting PJL command 143) to the printer 4. In the PC 1, processes similar to the above processes (executed when print data are outputted to the printer 4) are executed when the PJL commands are outputted to the printer 4. Specifically, when a PJL command is outputted by the client processing unit 115, the PJL command is handed over to the print spooler 113 via the printer driver 114. The print spooler 113 receiving PJL commands from the printer driver 114 successively stores the received PJL commands in the queue 141 in the HDD 14 as print jobs, while successively outputting the print jobs stored in the queue 141 to the printer 4 in order of storage or according to priorities assigned to the print jobs. Consequently, the PJL commands, handled in the same way as print data, are outputted to the printer 4.

While the internal composition of the PC 1 has been explained above as an example, the PCs 2 and 3 are also configured substantially in the same way. Slight difference among the PCs 1, 2 and 3 includes the printer I/F 16 (a USB interface in the PC 1, a parallel interface in the PC 2, and a USB interface in the PC 3) as mentioned above. However, such difference is irrelevant to the characteristics of the present invention and thus detailed explanation of the internal composition of the PCs 2 and 3 is omitted here.

As shown in FIG. 2, the printer 4 (of a model supporting the PJL) includes a control unit 41, a display unit 42, an input unit 43, a nonvolatile memory 44, a PC I/F 46 and a print unit 47.

The control unit 41 is mainly composed of a CPU, a ROM and a RAM which are well known. In the control unit 41, the ROM stores programs for controlling parts of the printer 4 and the CPU executes various processes according to the programs stored in the ROM, by which a PJL command processing unit 411 operates in the control unit 41. The PJL command processing unit 411 analyzes a PJL command received from the PC 1 and thereby executes a process requested by the PJL command. For example, when the printer 4 receives a PJL command requesting printer information (the printer information requesting PJL command 142) from the PC 1, the PJL command processing unit 411 analyzes the received PJL command, recognizes that the PC 1 is requesting the printer information, reads out the printer information 441 from the nonvolatile memory 44, and outputs the printer information 441 to the PC 1. When the printer 4 receives a PJL command requesting the printer 4 to set a prescribed initial value (the printer initial setting PJL command 143) from the PC 1, the PJL command processing unit 411 analyzes the received PJL command, recognizes that the PC 1 is requesting the setting of the initial value, and changes the setting of the printer 4 according to the command.

The display unit 42 is implemented by an LCD capable of displaying several lines of character strings including characters, simple symbols, etc. The input unit 43 is formed by an operation panel having keys for receiving input operation by the user.

The nonvolatile memory 44 is a unit capable of holding its memory contents (various data) even when the power of the printer 4 is turned OFF. A variety of information necessary for the operation of the printer 4 is stored in the nonvolatile memory 44. The nonvolatile memory 44 may be replaced with an HDD, for example. The nonvolatile memory 44 stores the printer information 441 as data related to the present invention. In this illustrative embodiment, the printer information 441 includes: (1) the model name of the printer, (2) the serial number assigned to the printer, and (3) the version of the printer (ROM version or firmware version). As shown in FIG. 3B, the model names of the printers 4, 5 and 6 are "LP1001", "LP1002" and "JP2001", the serial numbers of the printers 4, 5 and 6 are "PLU23456", "PLP34567" and "PLU23461", and the versions of the printers 4, 5 and 6 are "1.01", "2.11" and "1.03". By specifying a serial number, a printer having the specified serial number can be uniquely identified since no two printers are assigned the same serial number. Incidentally, the printer information 441 is used as "device information" in this system. The printer information 441 may also be information other than the model name, serial number or version, or may be a combination of multiple pieces of information selected from the model name, serial number, version and other information. Such information other than the model name, serial number or version can be the type of the print engine, the number of colors of ink/toner, the user name, information on the installation location of the printer, etc. Including such information in the printer information 441 is advantageous for checking the performance, installation location, status of use, etc. of the printer.

The PC I/F 46 is a unit for communicating with the PC 1. The PC I/F 46 in the printer 4 is a USB interface.

The print unit 47 is a unit for recording (printing) an image represented by image data on a sheet-like medium (e.g. paper).

While the internal composition of the printer 4 has been explained above as an example, the printers 5 and 6 are also configured substantially in the same way except for the standard of the PC I/F 46 (a USB interface in the printer 4, a parallel interface in the printer 5, and a USB interface in the printer 6), and thus detailed explanation of the internal composition of the printers 5 and 6 is omitted here.

The printer registration server 7 is a computer capable of executing processes in response to requests from clients (PCs 1, 2 and 3 in this illustrative embodiment) making access to the printer registration server 7 via the LAN 9. As shown in FIG. 2, the printer registration server 7 includes a control unit 71, a display unit 72, an input unit 73, an HDD 74 and a LAN I/F 75.

The control unit 71 is mainly composed of a CPU, a ROM and a RAM which are well known. In the control unit 71, an OS and server software are loaded into the RAM from the HDD 74. The CPU executes various processes according to the server software, by which a server processing unit 711 for executing processes in response to requests from the clients operates in the control unit 71.

The display unit 72 is implemented by an LCD, for example. The input unit 73 is formed by a keyboard and various pointing devices (e.g. mouse), for example.

The HDD 74 stores the OS, the server software for implementing the functions of the printer registration server 7, etc. Further, in the HDD 74, a printer initial setting PJL command 741 is stored and a printer information database 742 is constructed. While the details of the printer initial setting PJL command 741 and the printer information database 742 will be explained later, the printer initial setting PJL command 741 is transmitted from the printer registration server 7 to the PC 1 and stored in the HDD 14 of the PC 1 as the aforementioned printer initial setting PJL command 143 in a process which will be explained later.

The LAN I/F 75 is a unit for communicating with devices connected to the LAN 9. The LAN I/F 75 is mainly composed of a NIC.

In the following, the client process executed by (the client processing unit 115 of the control unit 11 of) the PC 1, a server process executed by (the server processing unit 711 of the control unit 71 of) the printer registration server 7 and a data reception process executed by the printer 4 upon data reception will be explained in detail. The client process, the server process and the data reception process are processes cooperatively implementing the functions of the device information management system in accordance with the present invention.

First, a process related to driver installation, as an example of the client process executed by the PC 1, will be explained referring to a flow chart of FIG. 4.

The client process of FIG. 4 is executed by the PC 1 when a printer (printer 4) is newly connected to the PC 1. While the client process can be started by the PC 1 in various ways (starting the process by reading a program from a record medium like a CD-ROM, starting the process by reading a program via a network, starting the process by executing a registration instruction (for registering the printer 4 in the PC 1) from a program already stored in the PC 1, etc.), it is assumed in this illustrative embodiment that the user of the PC 1 sets a record medium storing a program for executing the client process (e.g. CD-ROM) in the PC 1 and performs a prescribed operation. Such a record medium, containing the program of the printer driver 114 and the printer information requesting PJL command 142, is generally supplied to the user as an accessory of the printer 4. Incidentally, in cases where the OS has the function of automatically recognizing a device connected to the PC 1 (e.g. Windows (registered trademark)), the user connecting the printer 4 to the PC 1 is prompted to install a necessary driver, and thus the user can activate the client process by setting the record medium (accessory of the printer 4) in the PC 1.

When the program for executing the client process is loaded from the record medium into the PC 1 and the client process is started according to the program, the PC 1 first executes a driver installation process (S 105). By the driver installation process, the program of the printer driver 114 is loaded from the record medium into the PC 1 and stored in the HDD 14 while also being loaded into the RAM of the control unit 11, by which the printer driver 114 is activated in the PC 1 and communication between the PC 1 and the printer 4 becomes possible. Incidentally, the driver installation process of S105 corresponds to a conventional process generally executed by an installer for installing the printer driver.

The driver installation process may also be designed to give an instruction for registering the printer 4 in the PC 1 from the program of the printer driver 114 already stored in the HDD 14, that is, an instruction for registering a variety of information, necessary for the issuance of print instructions to the printer 4 via the printer driver 114 under the control of the OS of the PC 1, in the registry of the OS, etc.

Subsequently, the PC 1 transmits a PJL command and thereby acquires the printer information (the model name, serial number and version) from the printer 4 (S 110). The PJL command transmitted to the printer 4 in this step is the printer information requesting PJL command 142 which has been loaded from the record medium into the PC 1 and stored in the HDD 14. As explained before, the printer information requesting PJL command 142 is handed over to the print spooler 113 via the printer driver 114. The print spooler 113 processes the printer information requesting PJL command 142 as a print job in the same way as ordinary print data and thereby outputs the PJL command 142 to the printer 4. In the printer 4 receiving the PJL command in the same way as ordinary print data, the PJL command processing unit 411 recognizes that the received data is a PJL command and analyzes the command. When the received PJL command is found to be the printer information requesting PJL command 142 by the analysis, the printer information 441 is read out from the nonvolatile memory 44 and transmitted to the PC 1. Incidentally, the process executed on the printer side will be explained in detail later. The PC 1 reads back the printer information returned from the printer 4. While the concrete method of the reading back varies depending on the printer I/F 16, in the case of the PC 1 connected to the printer 4 via the USB interface (USB port), the client processing unit 115 first receives information via the printer I/F control unit 111 of the OS, repeats the information reception when the amount of received information is 0, and eventually acquires expected information by the repetition. In the case of the PC 2 connected to the printer 5 via the parallel interface (parallel port), the client processing unit first checks via the printer I/F control unit of the OS whether there exists information returned to the PC 2 and thereafter executes the information reception when there exists such information. Since data of some kind is eventually received in either case, each PC checks whether the received data is the expected data representing the printer information or not, repeats the reception when the received data is not the expected data, and eventually acquires the expected printer information. Consequently, the model name, serial number and version shown in FIG. 3B are acquired from each corresponding printer 4-6 as the printer information.

Subsequently, the PC 1 acquires the PC information 144 which is managed on the PC side by the OS (S115). By this step, the PC name shown in FIG. 3A is acquired as the PC information.

Subsequently, the PC 1 searches for the printer registration server 7 and connects thereto (S120). While the concrete method of S120 can vary depending on the data management protocol of the server, the use of a widely used LDAP (Lightweight Directory Access Protocol) server is assumed in this illustrative embodiment. The LDAP is a protocol allowing construction of a database in hierarchical tree structure as shown in FIG. 3C. In the example of FIG. 3C, a tree "devicemanager" existing under a root "JP" is used for storing data of the device information management system. A database in which the data should be registered may be determined in various ways, such as letting the user specify the database by use of a GUI, letting the administrator previously specify the database, or searching the network for the database. In the first method, the user may specify the printer registration server 7 by designating its IP address or PC name. In the second method, the administrator may describe the IP address or PC name of the printer registration server 7 in an initial setting file which is referred to by the client processing unit 115. In this case, the registration is completed without any particular operation by the user. In the third method, the PC 1 may broadcast a data packet inquiring about the presence/absence of the printer registration server 7 to the network and wait for a reply, or the PC 1 may find a port used by the printer registration server 7 and thereby search for a server having a prescribed tree ("devicemanager" in this example). After the database is determined, the PC 1 searches for a tree storing management data by making access to the LDAP server and checking whether there exists a prescribed tree ("devicemanager" in this example). If the prescribed tree is not found, the PC 1 recognizing that there exists no database for the registration executes a corresponding step or ends the process.

Subsequently, the PC 1 transmits the PC information and the printer information to the printer registration server 7 (S125). By the step S125, information as a combination of the PC name, the printer model name, the printer serial number and the printer version is supplied to the printer registration server 7.

Subsequently, the PC 1 shifts into a state for waiting for a communication from the printer registration server 7 (S130) and successively checks whether an initial setting PJL command file has been received (S135) and whether a registration completion report has been received (S140). If the judgment is "NO" both in S135 and S140, the PC 1 returns to the step S130 and repeats the loop of S130-S140. When the initial setting PJL command file is received during the repetition of the loop (S135: YES), the PC 1 stores the received initial setting PJL command file in the HDD 14 while transmitting the initial setting PJL command file 143 to the printer 4 ("device") (S150). In the printer 4 receiving the PJL command in the same way as ordinary print data, the PJL command processing unit 411 recognizes that the received data is a PJL command and analyzes the command. When the received PJL command is found to be the initial setting PJL command by the analysis, the initial setting of the printer 4 is executed according to the commend. In the initial setting PJL command, settings regarding the language, tray, sheet (paper), print quality, etc. are described as settings for adapting to the use environment of the user. Thereafter, the printer 4 transmits an initial setting completion report to the PC 1.

In response to the initial setting completion report from the printer 4, the PC 1 deletes the initial setting PJL command file 143 (which has been received from the printer registration server 7) from the HDD 14 (S155), and ends the client process of FIG. 4. Also when the registration completion report is received during the repetition of the loop of S130-S140 (S140: YES), the PC 1 ends the client process.

Next, the server process executed by the printer registration server 7 will be explained referring to a flow chart of FIG. 5. The server process is executed constantly by the printer registration server 7.

At the start of the server process, the printer registration server 7 waits for a communication from the PC 1 (S205) and checks whether the PC information and the printer information have been received (S210). If the PC information and the printer information have not been received (S210: NO), the printer registration server 7 returns to the step S205 and repeats the loop of S205-S210. When the step S125 in FIG. 4 or step S425 in FIG. 7 (explained later) is executed by the PC 1, the printer registration server 7 receives the PC information and the printer information during the repetition of the loop of S205-S210 (S210: YES). In this case, the printer registration server 7 judges whether a deregistration flag has also been received (S213). The deregistration flag is a flag indicating that information (the received PC information and printer information) should be deregistered from the database. In the case where the PC information and the printer information transmitted in the step S125 are received, the deregistration flag is not judged to have been received (S213: NO). On the other hand, when the PC information and the printer information transmitted in the step S425 (explained later) are received, the deregistration flag is judged to have been received (S213: YES).

If the deregistration flag has not been received (S213: NO), the printer registration server 7 registers the received PC information and printer information as an entry (S215), by which the PC information and printer information are registered in the printer information database 742 of the printer registration server 7 according to the hierarchical structure shown in FIG. 3C.

Subsequently, the printer registration server 7 judges whether a serial number contained in the received printer information exists in an initial setting list (S220). The initial setting list is a list containing serial numbers of printers that have been registered in the printer registration server 7. When the received serial number exists in the initial setting list, the printer registration server 7 can judge that the initial setting of a printer having the serial number has already been made. On the other hand, when the received serial number does not exist in the initial setting list, the printer registration server 7 can judge that the initial setting of the printer having the serial number has not been made yet.

If the serial number does not exist in the initial setting list (S220: NO), the printer registration server 7 judges whether the initial setting PJL command file has already been prepared therein (S225). If the initial setting PJL command file has already been prepared (S225: YES), the printer registration server 7 transmits the initial setting PJL command file 741 to the PC 1 (S230). The initial setting PJL command file 741 transmitted in the step S230 is received by the PC 1 in the loop of S130-S140 in FIG. 4 and the judgment of S135 results in "YES". Subsequently, the printer registration server 7 adds the serial number to the initial setting list (S235). Thereafter, the printer registration server 7 having finished all the server process of FIG. 5 returns to the step S205 and repeats the server process in the same way.

When the received serial number exists in the initial setting list (S220: YES) or when the initial setting PJL command file has not been prepared (S225: NO), the printer registration server 7 transmits the registration completion report to the PC 1 (S240) and thereafter returns to the step S205 to repeat the server process in the same way. The registration completion report transmitted in the step S240 is received by the PC 1 in the loop of S130-S140 in FIG. 4 and the judgment of S140 results in "YES".

In the step S213, if the deregistration flag has also been received (S213: YES), the printer registration server 7 deregisters the entry of the PC information and printer information (S250). Specifically, the database is searched using the serial number contained in the printer information as a key. When such an entry containing the key (serial number) is found, the entry is deleted or invalidated, by which the PC information and printer information which have been registered in the printer information database 742 of the printer registration server 7 are deregistered. Incidentally, when no entry containing the key (serial number) is found by the search, the printer registration server 7 may stop the process without executing anything or may execute an error process (e.g. returning an error message to the PC 1). The explanation and illustration of the exceptional process are omitted here.

Figure 5:
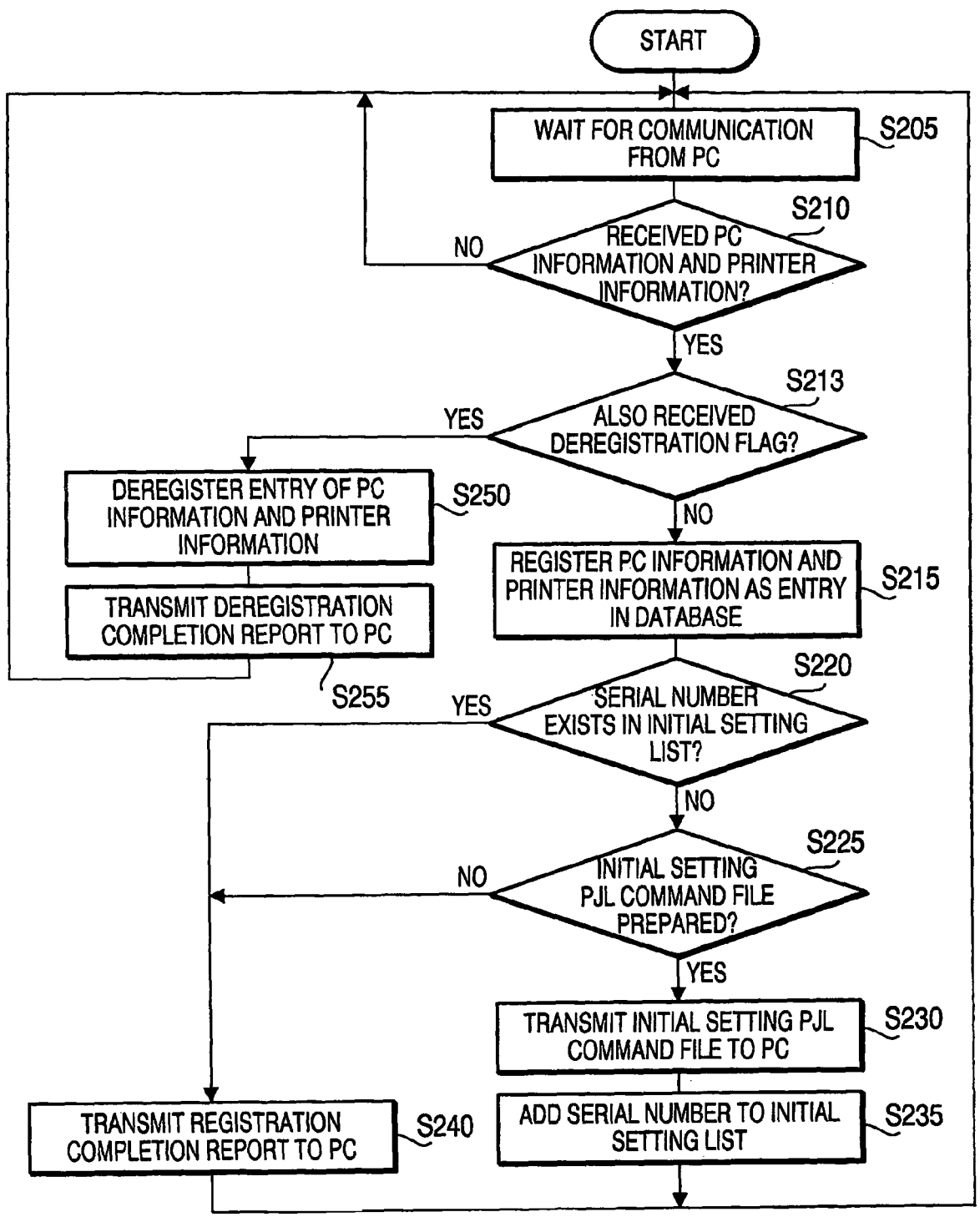
FIG. 5 is a flow chart showing a server process executed by the printer registration server according to at least one aspect of the invention.

When the deregistration is finished, the printer registration server 7 transmits a deregistration completion report to the PC 1 (S255) and thereafter returns to the step S205 to repeat the server process of FIG. 5 in the same way. The deregistration completion report transmitted in the step S255 is received by the PC 1 in a loop of S430-S440 in FIG. 7 (explained later) and a judgment of S440 results in "YES".

Figure 6:
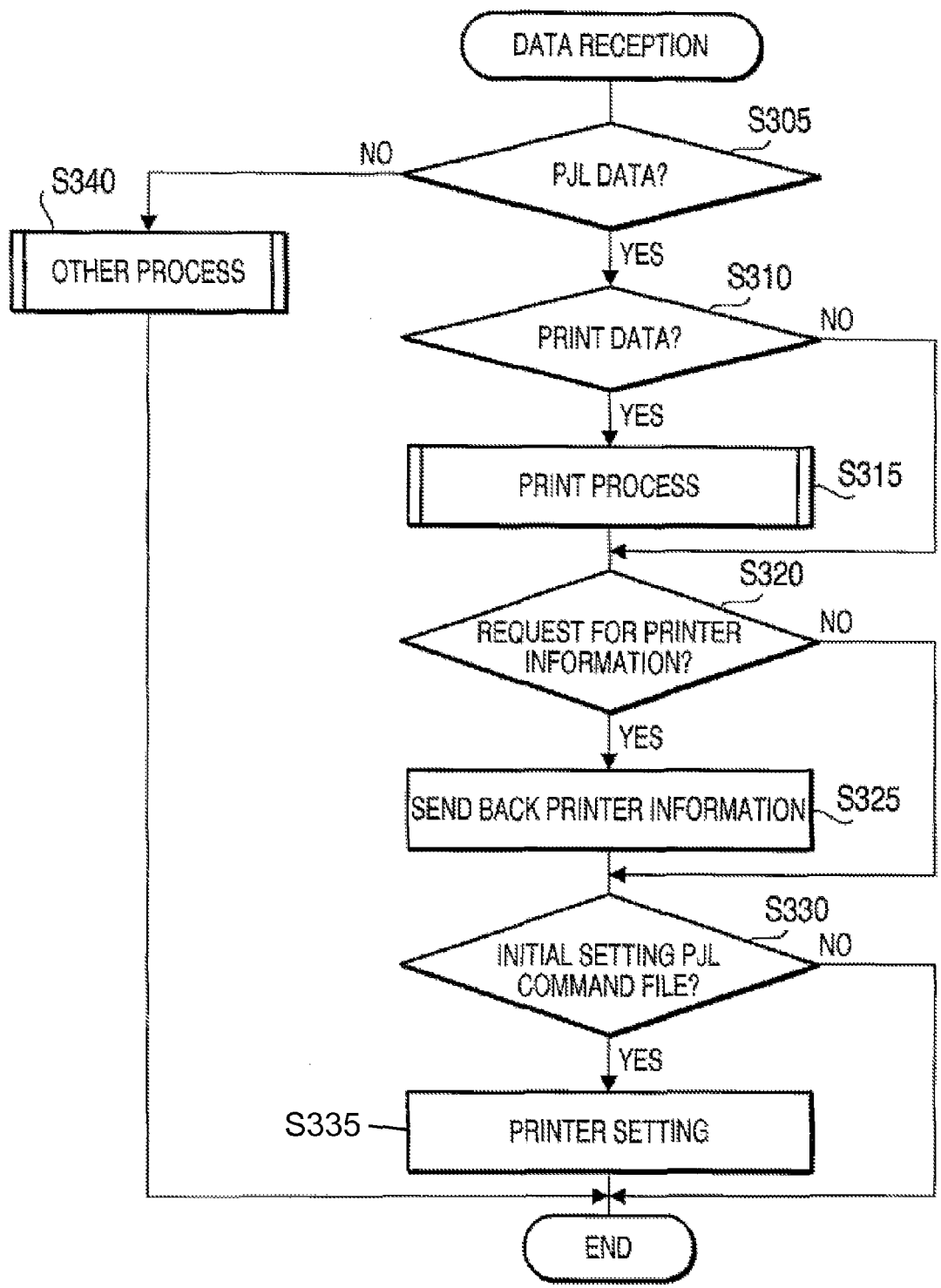
FIG. 6 is a flow chart showing a data reception process executed by the printer according to at least one aspect of the invention.

Next, the data reception process which is executed by the printer 4 upon data reception will be explained referring to a flow chart of FIG. 6.

The data reception process is executed when the printer 4 receives data via the PC I/F 46 (when the PJL command transmitted by the PC 1 in the step S110 or S150 is received, when print data generated by the application 116 of the PC 1 is received, etc.).

At the start of the data reception process, the printer 4 judges whether the received data is PJL data (S305).

If the received data is PJL data (S305: YES), the printer 4 further judges whether the PJL data is print data (S310) since the PC 1 sends ordinary print data and PJL commands to the printer 4 as PJL data in the same way. If the PJL data is print data (S310: YES), the printer 4 executes a print process (S315). If the PJL data is not print data (S310: NO), the printer 4 skips the step S315. While the print process of S315 is composed of several processes such as operation control of the print unit 47, feed control for feeding the sheet (paper) and display control for displaying a variety of information, detailed explanation of such a print process, common to this type of printers and irrelevant to the principal part of the present invention, is omitted here.

Subsequently, the printer 4 judges whether the PJL data is a request for the printer information (the printer information requesting PJL command 142 transmitted by the PC 1 in the step S110 of FIG. 4) (S320). If the PJL data is the request for the printer information (S320: YES), the printer 4 reads out its printer information 441 from the nonvolatile memory 44 and sends back the printer information 441 to the PC 1 (S325). If the PJL data is not the request for the printer information (S320: NO), the printer 4 skips the step S325.

Subsequently, the printer 4 judges whether the PJL data is the initial setting PJL command file (transmitted by the PC 1 in the step S150 of FIG. 4) (S330). If the PJL data is the initial setting PJL command file (S330: YES), the printer 4 makes the printer setting (initial setting) of itself according to the received initial setting PJL command file (S335). If the PJL data is not the initial setting PJL command file (S330: NO), the printer 4 ends the data reception process of FIG. 6.

In the step S305, if the received data is not PJL data (S305: NO), the printer 4 executes a process (other process) corresponding to the received data (S340). While the step S340 can include various processes, detailed explanation of such processes, irrelevant to the principal part of the present invention, is omitted here. After finishing the step S340, the printer 4 ends the data reception process of FIG. 6.

Next, a process related to driver uninstallation, as another example of the client process executed by the PC 1, will be explained referring to a flow chart of FIG. 7.

Figure 7:
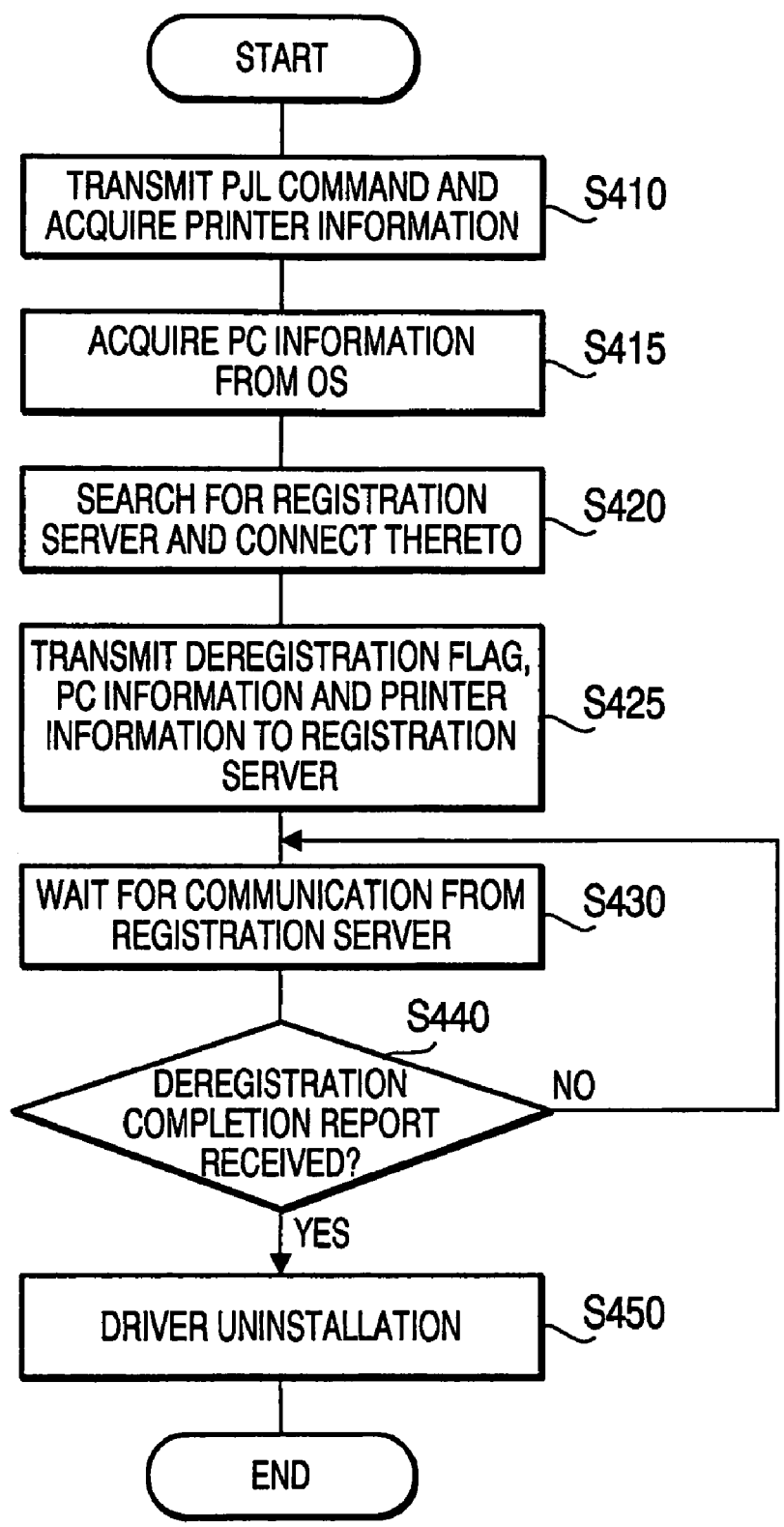
FIG. 7 is a flow chart showing an uninstallation process as another example of the client process executed by the PC according to at least one aspect of the invention.

The client process of FIG. 7 is executed by the PC 1 when the user performs an operation for requesting the deletion of the printer driver or an operation for requesting deregistration of the printer 4 from the PC 1. In the case where the operation for requesting the deregistration of the printer 4 is performed by the user, the printer driver is not deleted from the HDD 14 in step S450 which will be explained later and only the registration of the printer 4 in the registry of the OS, etc. is nullified.

At the start of the client process of FIG. 7, the PC 1 transmits a PJL command and thereby acquires the printer information from the printer 4 (S410). The step S410 is equivalent to the step S110 of FIG. 4 which has been explained above, and thus detailed explanation thereof is omitted here. While the model name, serial number and version of the printer 4 is acquired as the printer information in the step S410 (since a common PJL command is used both for the steps S110 and S410 in this illustrative embodiment), only the serial number is required in the step S410. Incidentally, if the PC 1 is configured to store the serial number acquired in the step S110 in the HDD 14 (as a modification of this illustrative embodiment), the PC 1 may read out the serial number stored in the HDD 14, instead of executing the step S410.

Subsequently, the PC 1 acquires the PC information 144 managed on the PC side by the OS (S415), searches for the printer registration server 7 and connects thereto (S420). The steps S415 and S420 are equivalent to the step S115 and S120 of FIG. 4 which have been explained above, and thus detailed explanation thereof is omitted here.

Subsequently, the PC 1 transmits the deregistration flag, the PC information and the printer information to the printer registration server 7 (S425). By the step S425, information as a combination of the deregistration flag, the PC name, the printer model name, the printer serial number and the printer version is supplied to the printer registration server 7.

Subsequently, the PC 1 shifts into a state for waiting for a communication from the printer registration server 7 (S430) and checks whether the deregistration completion report (transmitted by the printer registration server 7 in the step S255 of FIG. 5) has been received (S440). If the deregistration completion report has not been received (S440: NO), the PC 1 returns to the step S430 and repeats the loop of S430-S440. When the deregistration completion report is received during the repetition of the loop (S440: YES), the PC 1 executes a driver uninstallation process (S450), by which the program of the printer driver 114 is deleted from the HDD 14 of the PC 1 and information which has been registered in the registry of the OS, etc. is also deleted. After finishing the step S450, the PC 1 ends the client process of FIG. 7.

As described above, by the cooperation of the PCs 1-3 executing the client process(es), the printer registration server 7 executing the server process and the printers 4-6 executing the data reception process, the functions of the device information management system in accordance with the present invention are realized. With such a system, information on the printers 4-6 (so-called "local printers") connected to the USB/parallel ports of the PCs 1-3 can easily be collected in the printer registration server 7. Especially, the printer registration server 7 is capable of recognizing the connection of a new printer to a PC and registering the information on the printer in the printer information database 742 immediately, substantially at the point when the new printer becomes available to a PC by the printer driver installation.

The new printer and the corresponding PC (to which the printer is connected) are generally configured to communicate information with each other just after the installation process, and the power of the printer is unlikely to be turned OFF until a sequence of processes following the installation process is completed. Therefore, the printer information on the printer can be acquired and registered in the printer information database 742 with higher probability and reliability compared to cases where similar processes are executed with different timing.

Consequently, a list for the management of the local printers (that used to be difficult to keep track of) can be made up with ease by referring to the printer information database 742, by which the status of use and connections of a plurality of printers connected to PCs can be checked out with extreme ease even when multitudes of local printers are introduced into an office, for example.

Since the PC names, the printer model names and the printer serial numbers are registered in the printer information database 742, even when it becomes necessary to take simultaneous action on a plurality of printers of the same model or to check printers having serial numbers within a particular range in order to update the driver or firmware, the connections of the printers in question to PCs can easily be checked by reference to the printer information database 742.

Further, since registration information (the information to be registered in the printer information database 742) is sent to the printer registration server 7 upon installation of the printer driver, even when a printer is used by a different user and the driver of the printer is installed in a different PC, such a situation can be grasped with ease and the time and trouble for the management of the printers can be saved when such management is necessary.

Generally, the use of the PJL command for the acquisition of the printer information on a printer when the printer is already in use for printing can cause ill effects, such as keeping the user waiting for the restart of printing. However, in this illustrative embodiment, the printer information can be acquired (the PJL command can be used) just after the driver installation (at the stage before the printer is used for printing), by which the ill effects on the use environment or printing operation are eliminated.

Since the driver installation is indispensable for starting the use of a printer, forgetting to register the printer information can be avoided in this illustrative embodiment in which the registration of the printer information is conducted in conjunction with the driver installation.

In this illustrative, the initial setting PJL command file (a PJL command file for the initial setting) is prepared in the printer registration server 7 and the initial setting is made to each printer for which the driver installation is executed, in conjunction with the driver installation. Therefore, the administrator of the system is relieved of the task of changing the settings of each printer after purchasing it or prompting the user of each PC to change its settings by informing the user of the method for changing the settings, by which proper operation of the system is made possible with ease.

In addition to the above effects achieved in driver installation, the registration of each printer in the printer registration server 7 can be nullified only by uninstalling the driver. Therefore, the user is relieved of the need of separately executing the uninstallation of the driver and the deregistration of the printer from the printer registration server 7, by which unnecessary registration information can be deleted from the server with reliability.

While a description has been given above of an illustrative embodiment in accordance with the present invention, the present invention is not to be restricted by the particular illustrative embodiment and a variety of modifications, design changes, etc. are possible without departing from the scope and spirit of the present invention described in the appended claims.

For example, while the printer registration server 7 in the above illustrative embodiment was assumed to have the function of an LDAP (Lightweight Directory Access Protocol) server, the structure of the database may be selected arbitrarily and the printer registration server 7 may be designed as a server capable of constructing the database according to a method other than LDAP. Specifically, the printer registration server 7 may be a database server employing SQL (Structured Query Language), etc. or an original database server employing no ready-made protocol or data structure.

While printers were taken as examples of the "devices" in the above illustrative embodiment, any device that is locally connected to a PC (any device that is not easily recognized from across a network) can be the "device" as a target of management by the device information management system in accordance with aspects of the present invention. Specifically, the "devices" may include various image input devices (scanners, cameras, etc.), various storage devices (HDDs, removable disk devices, etc.), etc.

While the printer driver was taken as an example of a device driver in the above illustrative embodiment, aspects of the present invention may also be applied to an I/F driver which controls the printer I/F 16 of each PC, for example.

What is claimed is:

1. A device information management system comprising:
a server;
a client configured to communicate with the server via a first communication channel; and
an image forming device configured to connect to the client to communicate with the client via a second communication channel different from the first communication channel,
wherein the image forming device includes:
an image formation unit configured to execute image formation in accordance with an image formation command received through the second communication channel; and
a device information sending-back unit configured to send device information, including device identification information uniquely identifying the device, back to the client via the second communication channel in response to receiving a device information requesting command from the client via the second communication channel, and
wherein the client is further configured to:
read a device driver and a client program from a recording medium;
install the device driver and the client program, wherein the device driver is configured to enable the client to communicate with the image forming device via the second communication channel and wherein the client program is configured to cause the client to act as a client unit, wherein installing the device driver includes loading and activation of the device driver;
determine whether installation of the device driver and the client program has been completed; and
when acting as the client unit:
send the device information requesting command to the image forming device via the second communication channel in response to determining that the installation of the device driver and the client program has been completed, and
send the received device information and client information including client identification information uniquely identifying the client to the server via the first communication channel in response to receiving the device information sent back by the image forming device via the second communication channel following transmission of the device information requesting command to the image forming device, and
wherein the server is configured to:
receive the device information and the client information from the client via the first communication channel; and
register the received device information and the client information in association with one another in a database.

2. The device information management system according to claim 1, wherein:
the device enables supplying of the device information to the client via the second communication channel when the device information requesting command is received from the client.

3. The device information management system according to claim 1, wherein the device identification information includes a serial number of the device uniquely identifying the device.

4. The device information management system according to claim 1, wherein the device information supplied to the client via the second communication channel includes version information on the device.

5. The device information management system according to claim 1, wherein:
the server is further configured to:
judge whether the received device information is information corresponding to a device which has already been registered in the database; and
supply setting information to be used for making settings of the device to the client via the first communication channel when the device information is judged not to be information corresponding to an already-registered device, wherein the setting information is prepared in the server prior to the judgment unit judging whether the received device information is information corresponding to an already-registered device, and
the client is further configured to:
receive the setting information supplied from the server; and
transmit a setting instruction for setting the device to the device via the second communication channel according to the received setting information.

6. The device information management system according to claim 1, wherein the server is further configured to register the device information and the client information in the database in association with each other.

7. The device information management system according to claim 6, wherein the client information includes a computer name assigned to the client.

8. The device information management system according to claim 1, wherein the device driver is software configured to communicate with and control the device.

9. The device information management system according to claim 8, wherein:
the device is a printing device having a printer function, and
the device driver is a printer driver.

10. A method comprising:
reading, by a client device, a program for a client process from a recording medium in which the client process, a device driver and a device information requesting command are recorded, wherein the device information requesting command corresponds to requesting the device information including a serial number of a device different from the client device;
determining whether a device registration process for communication with the device has been completed, wherein the device registration process comprises installation of the device driver, including loading and activation of the device driver;
in response to determining that the device registration process for communication with the device has been completed at the client device:
requesting, by the client device, the device information including the serial number of the device from the device via a communication channel;
connecting to a registration server upon installing the device driver at the client device; and
automatically supplying, by the client device, the requested device information including the serial number of the device and client information stored in the client device to the registration server for registering the client information with the device information in the registration server, wherein the supplying is performed via another communication channel and wherein the registration server is different from the device and the client device.

11. The device information management system of claim 1, wherein the client is further configured to:
receive user input corresponding to a request to uninstall the device driver, wherein the device is registered with the server;
in response to receiving the user input and prior to initiating an uninstall process to uninstall the device driver from the client, automatically supply the device information, which has already been registered in the server, to the server via the first communication channel prior to a device deregistration process for deregistering the device; and
initiate the uninstall process to uninstall the device driver of the device from the client only upon receipt of a deregistration completion report from the server.

12. The device information management system of claim 1, wherein the client is configured to send the device information requesting command to the image forming device via the second communication channel, in response to determining that the installation of the device driver and the client program has been completed, without requiring an instruction to execute the image formation.

13. A computer, comprising:
a processor; and
memory storing computer readable instructions that, when executed by the processor, cause the computer to:
read a program for a client process from a recording medium in which the client process, a device driver and a device information requesting command are recorded, wherein the device information requesting command corresponds to requesting the device information including a serial number of a device different from the computer;
determine whether a device registration process for communication with the device has been completed, wherein the device registration process comprises installation of the device driver, including loading and activation of the device driver;
in response to determining that the device registration process for communication with the device has been completed at the computer:
request the device information including the serial number of the device from the device via a communication channel;
connect to a registration server; and
automatically supply the requested device information including the serial number of the device and client information stored in the computer to the registration server for registering the client information with the device information in the registration server, wherein the supplying is performed via another communication channel.

14. A non-transitory computer storage medium comprising computer-readable instructions that, when executed, cause a computer to:
read a program for a client process from a recording medium in which the client process, a device driver and a device information requesting command are recorded, wherein the device information requesting command corresponds to requesting the device information including a serial number of a device different from the computer;

determine whether a device registration process for communication with the device has been completed, wherein the device registration process comprises installation of the device driver, including loading and activation of the device driver;

in response to determining that the device registration process for communication with the device has been completed at the computer:
- request the device information including the serial number of the device from the device via a communication channel;
- connect to a registration server upon installing the device driver at the computer; and
- automatically supply the requested device information including the serial number of the device and client information stored in the computer to the registration server for registering the client information with the device information in the registration server, wherein the supplying is performed via another communication channel and wherein the registration server is different from the device.

15. A method comprising:

reading, by a client device, a program for a client process from a recording medium in which the client process, a device driver and a device information requesting command are recorded, wherein the device information requesting command corresponds to requesting the device information including a serial number of a device different from the client device;

determine whether a device registration process for communication with the device has been completed, wherein the device registration process comprises installation of the device driver, including loading and activation of the device driver;

in response to determining that the device registration process for communication with the device has been completed at the computer:
- requesting, by the client device, the device information including the serial number of the device from the device via a communication channel;
- connecting to a server upon installing the device driver at the client device; and
- automatically supplying, by the client device, the requested device information including the serial number of the device and client information stored in the client device to the server via another communication channel, the server being different from the device and the client device.

* * * * *